United States Patent Office 3,518,556
Patented June 30, 1970

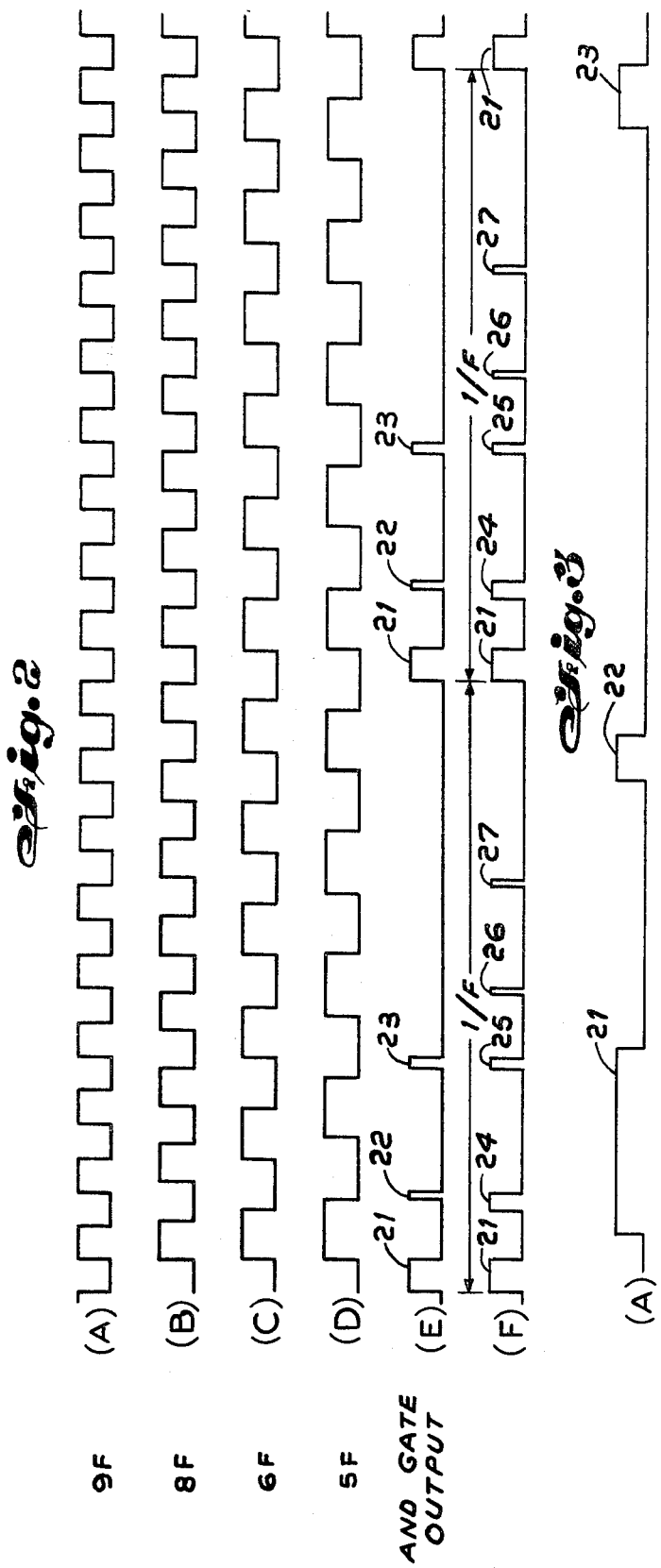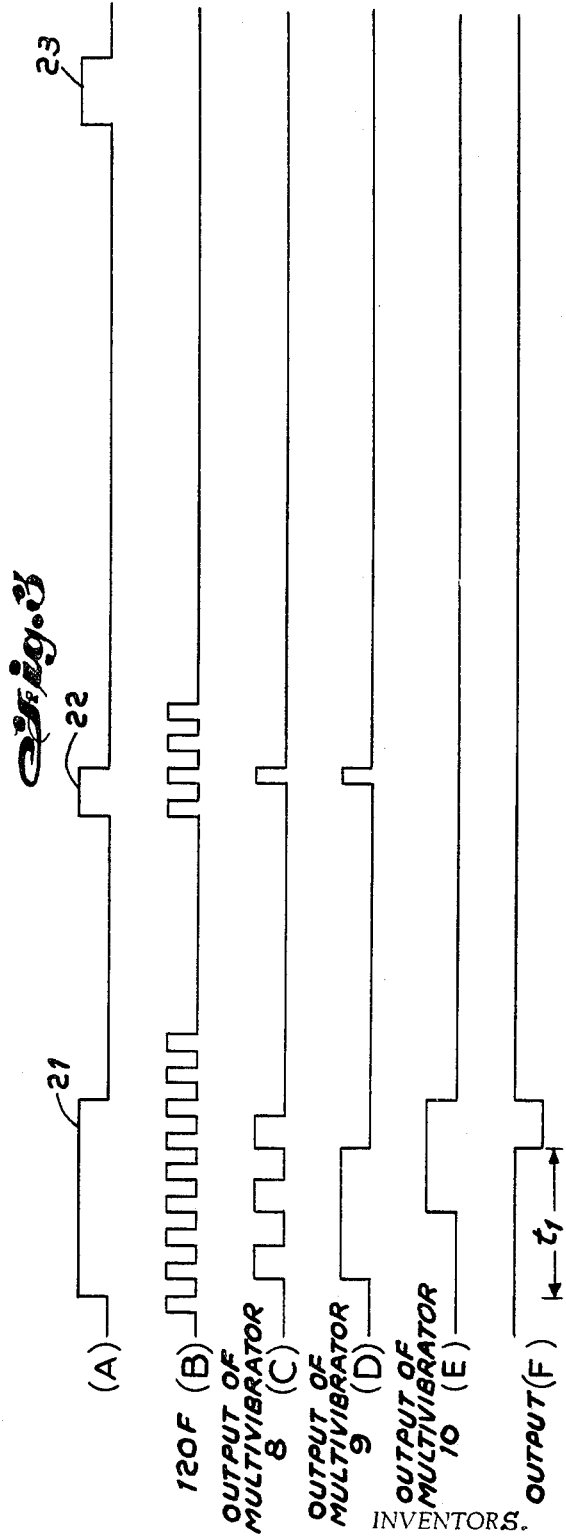

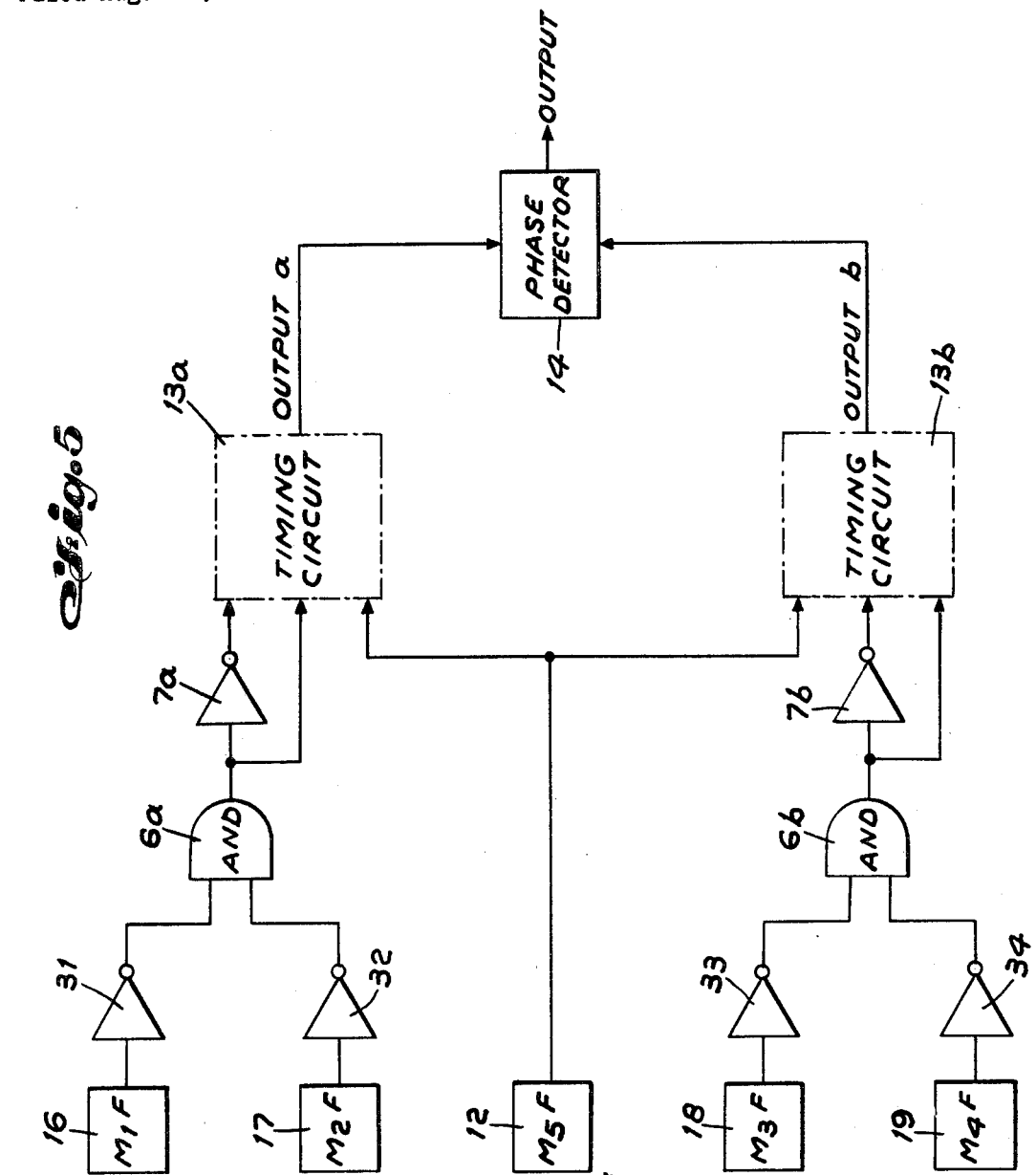

3,518,556
MULTIPULSE DETECTOR FOR HARMONICALLY
RELATED SIGNALS
Christian Fredrik Holmboe, Bekkestua, Norway, James
F. De Lorme, Irvington, N.J., and Rolf Gunnar Sommerud, Strommen, Norway, assignors to International
Telephone and Telegraph Corporation, Nutley, N.J., a
corporation of Delaware
Filed Aug. 31, 1966, Ser. No. 576,297
Int. Cl. H03d 13/00
U.S. Cl. 328—133                6 Claims

ABSTRACT OF THE DISCLOSURE

A frequency detector for detecting the lowest common frequency of a plurality of harmonically related signals comprising an arrangement of inverting amplifiers coupled to the input signals, an AND gate coupled to the inverting amplifiers for generating a coincidence pulse when the input signals are in coincidence, and an arrangement of multivibrators in the form of a counter coupled to the AND gate for measuring the duration of the coincidence pulse and generating an output pulse when the duration of the coincidence pulse exceeds a predetermined value.

This invention relates to multipulse detectors and more particularly to multipulse detectors for harmonically related signals, wherein at least one of said signals has a different frequency than the others.

In many communications systems, navigation systems and the like, it is required to synchronize a plurality of such signals having harmonically related frequencies with a reference frequency signal. The prior art solution to this problem utilized an analog detection scheme in which the signals of various frequencies were combined in an analog manner and the detection apparatus "looked" for the point in time at which the maximum amplitude pulse emitted by the combiner appeared. This peak amplitude pulse, which appeared every $1/F$ seconds, where F is the lowest frequency common to all of the input signals, was then used for the synchronization operation. This analog method of detection has the disadvantage of being very susceptible to noise signals appearing in the system, thereby decreasing the reliability of the detection process. Another disadvantage of the prior art analog systems is that if one of the input signals drops out it is possible that an error in the detection process will result because the peak amplitude pulse may occur at a different time.

Therefore, it is the main object of this invention to provide a detector capable of providing a synchronization signal upon receipt of a plurality harmonically related signals wherein at least one of said signals has a frequency different from the others which is less susceptible to noise and which will successfully operate even if one of said plurality of signals drops out.

A multipulse detector according to this invention includes a source of two or more harmonically related input signals and means coupled to at least two of such input signals for generating a coincidence signal when the coupled input signals are in coincidence. The detector further includes timing means coupled to the generating means for timing the duration of coincidence and provides an output pulse when the duration of coincidence exceeds a predetermined value.

The above-mentioned and other objects of this invention will become apparent by reference to the following description taken in conjunction with the accompanying drawings in which:

FIG. 2 is an illustration of pertinent waveforms appearing in the circuit of FIG. 1;

FIG. 3 is an illustration of other waveforms appearing in the circuit of FIG. 1 plotted on an expanded time-base;

FIG. 4 is a "truth table" for the multivibrator utilized in the embodiment of FIG. 1; and FIG. 5 is a block diagram of another multipulse detector according to this invention.

Figure 1:
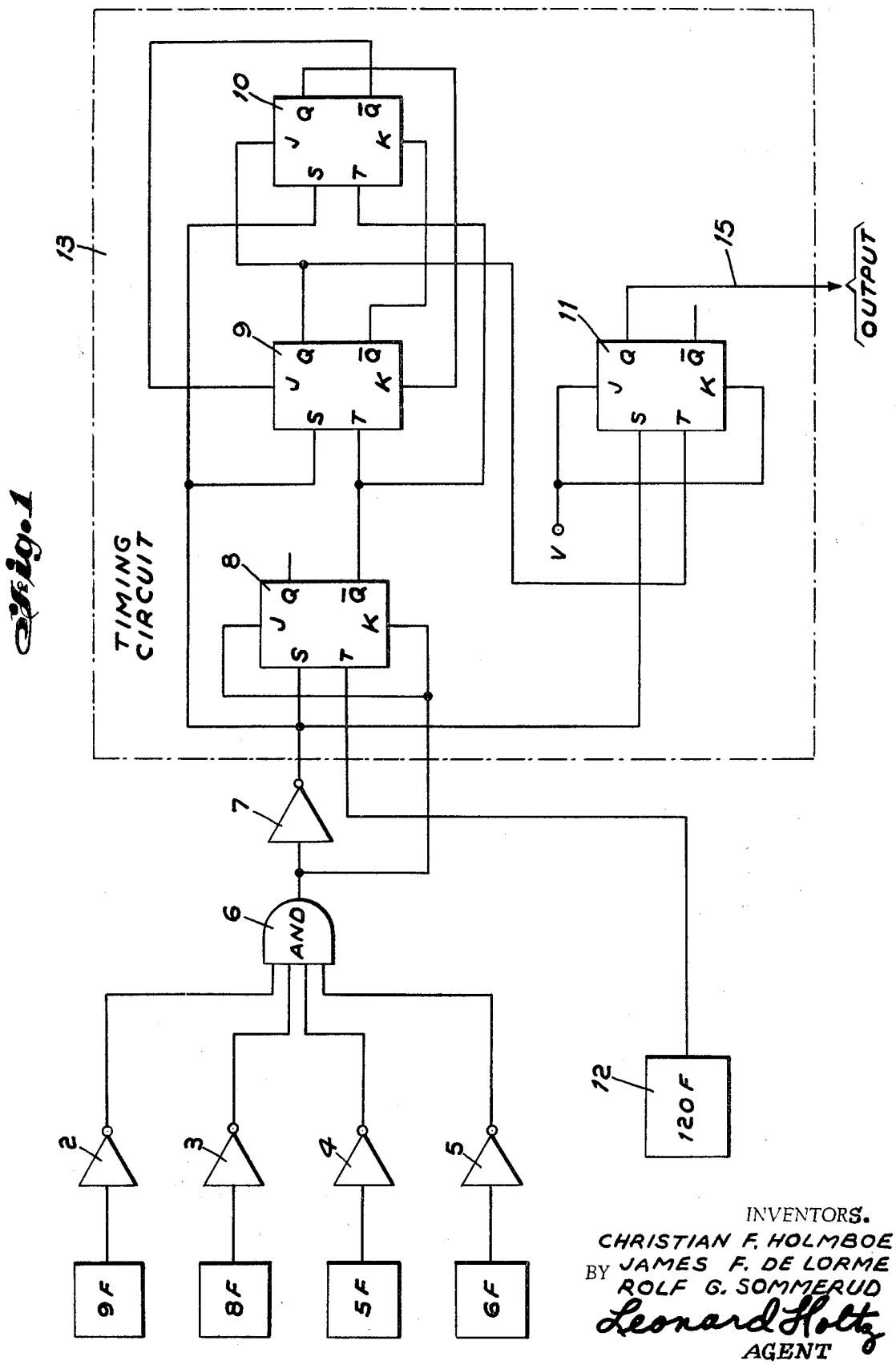
FIG. 1 is a block diagram of a preferred embodiment of a multipulse detector according to this invention.

Referring to FIG. 1 a specific embodiment of a multipulse detector according to this invention is illustrated for input signals having the frequencies 5F, 6F, 8F and 9F c.p.s. These signals are assumed to be digital in nature for the purposes of this example. The common subharmonic frequency of all of these signals is F c.p.s. and it is ultimately desired to synchronize the incoming signals 5F, 6F, 8F and 9F with a reference signal having the frequency F c.p.s.

The multipulse detector illustrated in FIG. 1 comprises inverting amplifiers 2, 3, 4 and 5, the inputs of which are coupled to the input signal sources 9F, 8F, 5F and 6F, respectively. The outputs of amplifiers 2 through 5 are coupled to the inputs of AND-gate 6, the output of which is coupled to inverting amplifier 7 and to the J and K inputs of multivibrator 8. The output of amplifier 7 is coupled to the S input of multivibrator 8. Coupled to the T input of multivibrator 8 is frequency source 12 which generates a signal having a frequency of 120F in this particular embodiment. The output of amplifier 7 is further coupled to the S inputs of multivibrators 9, 10 and 11. The $\bar{Q}$ output of multivibrator 8 is coupled to the T inputs of multivibrators 9 and 10 and the Q output of multivibrator 9 is coupled to the J input of multivibrator 10 and to the T input of multivibrator 11. The $\bar{Q}$ output of multivibrator 9 is coupled to the K input of multivibrator 10. The $\bar{Q}$ output of multivibrator 10 is coupled back to the J input of multivibrator 9 and the Q output of multivibrator 10 is coupled back to the K input of multivibrator 9. The J and K input of multivibrator 11 is coupled to a logical "1" level V. The purpose of the circuitry comprising multivibrators 8, 9, 10 and 11 and signal source 12 is to provide an output signal at the Q output of multivibrator 11 when the duration of the pulses produced by AND-gate 6 exceed a predetermined value. The timing circuit comprising multivibrator 8–11 is generally denoted as element 13 in FIG. 1.

Operationally, referring to FIGS. 1 and 2 the input signals 5F, 6F, 8F and 9F (shown in FIG. 2, A through D, appear at the inputs of inverting amplifiers 2 through 5. The outputs of amplifiers 2 through 5 are applied to AND-gate 6, thereby producing the output signal appearing in FIG. 2E. Note that in FIG. 2E one pulse 21 has a longer duration than the other pulses 22 and 23 and that the repetition rate of the output signal from AND-gate 6 is F cycles per second (i.e., the sequence of pulses 21, 22 and 23 is repeated every $1/F$ seconds, as shown in FIG. 2E). The widest pulse is pulse 21 whose duration is $1/18F$ seconds and the next widest is pulse 23 whose duration is approximately $0.35/18F$ seconds. In the circuitry comprising multivibrators 8, 9, 10 and 11 and signal source 12 the duration of each of the pulses 21, 22 and 23 are timed, and if their time duration exceeds a predetermined value, which in this case is approximately $0.75/18F$, an output signal is produced on output line 15. It is clear that in this embodiment a signal will appear on output lead 15 in a position in time corresponding to the pulse 21 since it is the only pulse with a duration greater than $0.75/18F$ (as shown in FIG.

2E). The output signal on lead 15 will have a repetition rate of F cycles per second, where F is the subharmonic frequency common to all of the input signals.

Referring to FIGS. 1 through 4, a more detailed description of the operation of the timing circuit which includes multivibrators 8, 9, 10 and 11 and source 12 is given below. The waveforms of FIG. 3 are on an expanded time scale relative to the time scale of FIG. 2 in order to more clearly illustrate the operation of the timing circuitry. FIG. 4 illustrates a "truth table" for the multivibrators of FIG. 1. When pulse 21 (FIG. 3) is applied to the J and K inputs of multivibrators 8 a "0" logic level is simultaneously applied via inverter 7 to the S inputs of multivibrators 8, 9, 10 and 11, thereby enabling said multivibrators. When enabled, the multivibrators act as frequency dividers in the normal manner for the signals applied to their T inputs. As long as pulse 21 is present, multivibrators 8–11 remain enabled and as illustrated in FIG. 3, if pulse 21 has a duration long enough an output signal will be generated at the Q output of multivibrator 11. When pulse 21 ends, the multivibrators 8–11 are all reset to their initial positions by means of a logical "1" appearing at the S inputs thereof. Thereby, the timing circuit is placed in condition to begin another timing operation. As seen from the truth table of FIG. 4 when a logical "1" is applied to the S terminal of a multivibrator, the Q outputs of the multivibrators will become logical "1" no matter what the input to the trigger (T) circuit is.

Therefore, as seen from the above description, an output will appear on lead 15 only if the duration of a pulse 21 is long enough for the timing circuit to go through its complete cycle. In this example pulse 21 has a duration of 1/18F seconds and the predetermined time for the timing circuit to complete its cycle is 0.75/18F seconds. When a pulse such as pulse 22 (FIG. 3) is applied to the timing circuit, the timing cycle is started as shown in FIG. 3 but is never allowed to complete its cycle since pulse 22 is turned off, thereby resetting multivibrators 8–11 before an output signal is generated on lead 15. In this manner whenever a pulse is of too short a duration to provide an output signal, the timing circuit will automatically be reset upon disappearance thereof, thereby placing it in condition for receipt of the next pulse.

It is noted that the trailing edge of the pulse 21 corresponds to the common leading edge of all of the input signals to the detector circuit, since all of the input signals were inverted by amplifiers 2–5 before being processed. It is further noted that the repetition rate of the pulse 21 is 1/F seconds where F is the common subharmonic frequency of all of the input signals. The output pulse train of frequency F has a fixed phase relationship to the four input signals of frequency 5F, 6F, 8F and 9F and may then be applied to a phase detector in order to phase lock the derived frequency F with a master frequency F.

In the instant embodiment of this invention if one of the channels is more than approximately 4% to 6% out of phase with the other 3 channels (depending upon which channel is out of phase), detection could possibly be lost. This is of no great disadvantage since the input signals are maintained well within a 4 to 6% phase lock. It is further pointed out that if one of the channels should drop out completely it is still possible to maintain detection and provide an output pulse of frequency F which has a fixed phase relationship to the remaining three signals. For example, assuming that the input signal 5F drops out and one wishes to derive the subharmonic frequency F from the remaining three signals. FIG. 2F illustrates the resulting output of AND-gate 6 when the 5F signal drops out. From FIG. 2F it is seen that there will still be a pulse 21 having a duration of 1/18F seconds as there was when all four signals were present and that the repetition rate of this pulse 21 is still F cycles per second. Note that when all four input signals were present there were only 2 extra pulses 22 and 23 occurring between successive pulses 21 whereas when the 5F signal drops out there are four extra pulses 24, 25, 26 and 27 occurring between successive pulses 21. Pulse 24 has a duration of 0.5/18F seconds and is the longest duration pulse other than pulse 21. It is seen that the timing circuit which "looks" for a pulse having a duration greater than 0.75/18F will still only provide an output signal when pulse 21 is applied to its input since the other pulses 24–27 all have a duration of less than 0.75/18F seconds. The repetition rate of pulses 21 is still F cycles per second and the frequency F derived therefrom has the same phase relationship with the prior frequency F derived from the signal when all four input signals were present. Therefore there will be no discontinuity when an input signal drops out. Similar results would be obtained if one of the other input signals were to drop out and a detailed explanation of the ensuing sequence of events is not deemed necessary for a proper understanding of this invention.

In many systems two different channels of information must be processed, each channel comprising signals of different frequencies. In this type of system it is desired to synchronize each channel with the other. This may be easily done with a system according to this invention, a particular embodiment of which is illustrated in block form in FIG. 5. The elements of FIG. 5 are given the same or similar designations as those of FIG. 1 wherever possible.

In this example it is assumed that there are two separate channels of information, channel $a$ having signals of frequency $M_1F$ and $M_2F$ and channel $b$ having the frequencies $M_3F$ and $M_4F$. These signals are represented by sources 16, 17, 18 and 19, respectively, shown in FIG. 5. Sources 16–19 are coupled to inverting amplifiers 31–34, respectively, the outputs of amplifiers 31 and 32 feeding AND-gate 6$a$ and the outputs of amplifiers 33 and 34 feeding AND-gate 6$b$. The output of AND-gate 6$a$ is coupled to inverting amplifier 7$a$ and to timing circuit 13$a$, the output of amplifier 7$a$ also being coupled to timing circuit 13$a$. The output of AND-gate 6$b$ is coupled to inverting amplifier 7$b$ and to timing circuit 13$b$, the output of amplifier 7$b$ also being coupled to timing circuit 13$b$. Further coupled to timing circuits 13$a$ and 13$b$ is a source of frequency 12 having a frequency in $M_5F$ where $M_5$ is greater than the other input frequencies, $M_1F$–$M_4F$. AND-gates 6$a$ and 6$b$ perform the same function as AND-gate 6 of FIG. 1, and inverting amplifiers 7$a$ and 7$b$ perform the same function as inverting amplifier 7 of FIG. 1. Signal source 12 having a frequency $M_5F$ performs the same function as source 12 of FIG. 1 which has the frequency 120F. The timing circuits 13$a$ and 13$b$ are similar to the timing circuit 13 illustrated in FIG. 1 except that the duration of the pulse required for timing circuits 13$a$ and 13$b$ to produce outputs depends upon the input frequencies of sources 16–19. Any such modification to the timing circuit 13 should be apparent to one ordinarily skilled in the art within the spirit of this invention. The outputs of the timing circuits 13$a$ and 13$b$ may then be coupled to a utilization device such as a phase detector 14.

In FIG. 5 it is readily seen that the system comprises two channels $a$ and $b$, channel $a$ being fed by signal sources 16 and 17 and channel $b$ being fed by signal sources 18 and 19. In the same manner as described with respect to FIG. 1, timing circuit 13$a$ will provide an output signal having a basic frequency of F cycles per second and having a fixed phase relationship to the input signals $M_1F$ and $M_2F$. Similarly, the output of timing circuit 13$b$ will likewise be a signal having a basic frequency of F cycles per second having a fixed phase relationship to the input signals $M_3F$ and $M_4F$. In this manner there is derived two signals, each having a frequency F and each having a fixed phase relationship to the input signals of their respective channels. These output signals from timing circuits 13a and 13b may then be applied to a utilization device and processed in any desired manner. In this particular embodiment these outputs are shown coupled to a phase detector 14 which provides a signal proportional to the phase difference between the two signals being fed thereto. This signal may then be fed back to the input circuit for either channel a or channel b to provide a delay in order to cause the two channels to be in phase or to be out of phase by a predetermined amount, depending upon the use to which the system is being put.

It is pointed out that the system illustrated in FIG. 5 is merely another application of the basic invention illustrated in FIG. 1. It is realized that many other embodiments utilizing the inventive concept should be apparent to one having ordinary skill in the art.

While we have described above the principles of our invention in connection with specific apparatus, it is to be clearly understood that this description is made only by way of example and not as a limitation to the scope of our invention, as set forth in the accompanying claims.

We claim:
1. A multipulse detector comprising:
   a source of a plurality of harmonically related input signals;
   means coupled to at least two of said input signals for generating an output coincidence signal when the coupled input signals are in coincidence;
   timing means coupled to the output of said generating means for measuring the duration of said output coincidence signal and for providing an output pulse when the duration of said coincidence signal exceeds a predetermined value;
   said timing means including
       a source of signals having a higher frequency than the frequencies of said input signals; and
       a plurality of multivibrators coupled to said source of higher frequency signals and to said generating means for timing the duration of said coincidence signal.

2. A multipulse detector according to claim 1 wherein said coupled input signals have different harmonically related frequencies.

3. A multipulse detector according to claim 1 wherein said multivibrators are all reset upon the ending of said coincidence signal.

4. A multipulse detector according to claim 1 wherein said generating means includes an AND-gate coupled to said input signals.

5. A multipulse detector according to claim 4 wherein said generating means further comprises an inverting amplifier coupled to the output of said AND-gate.

6. A multipulse detector comprising:
   a source of a plurality of harmonically related input signals;
   means coupled to at least two of said input signals for generating an output coincidence signal when the coupled input signals are in coincidence;
   timing means coupled to the output of said generating means for measuring the duration of said output coincidence signal and for providing an output pulse when the duration of said coincidence signal exceeds a predetermined value;
   a second generating means coupled to at least a second two of said plurality of input signals for generating a second coincidence signal when said second coupled signals are in coincidence;
   second timing means coupled to said second generating means for providing a second output pulse when the duration of said second coincidence signal exceeds a predetermined value, said second generating means being coupled to different frequency input signals than said first generating means; and
   a phase detector coupled to the outputs of said first and second timing means for generating a signal proportional to the phase difference between the outputs of said first and second timing means.

References Cited

UNITED STATES PATENTS 3,267,381   8/1966   Thornberg et al. __ 328—110 XR

JOHN S. HEYMAN, Primary Examiner

J. ZAZWORSKY, Assistant Examiner

U.S. Cl. X.R.

307—233, 269, 293; 328—158